June 17, 1930.    G. G. MORIN    1,765,090
BALANCED THREE-WAY VALVE
Filed Jan. 4, 1928
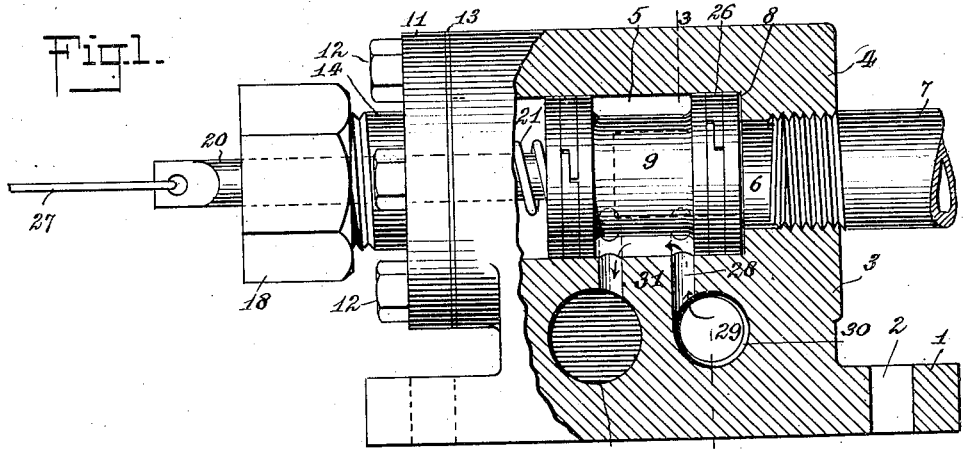
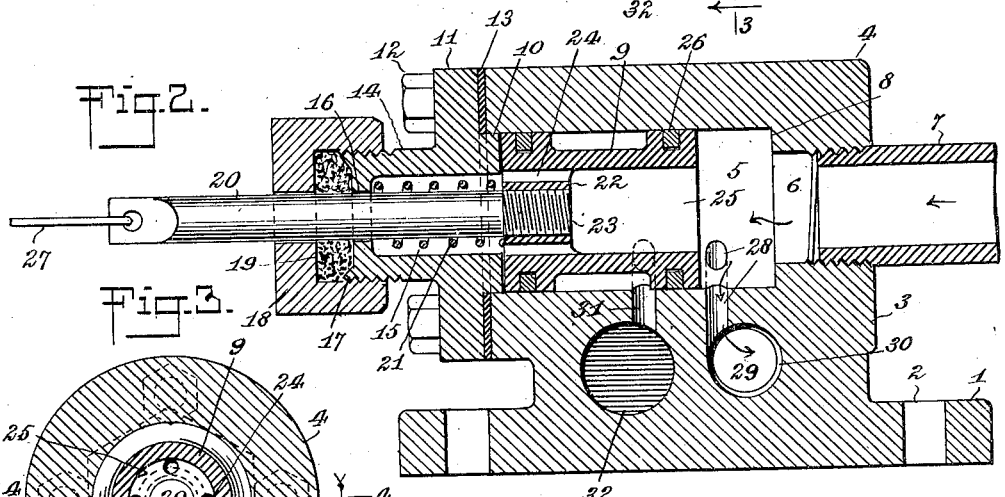
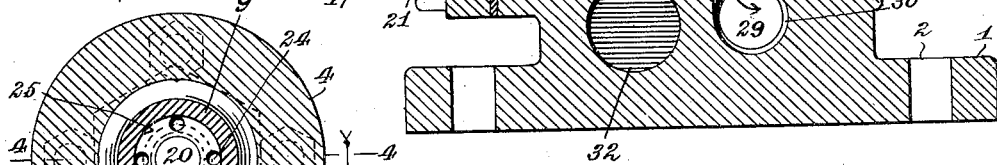
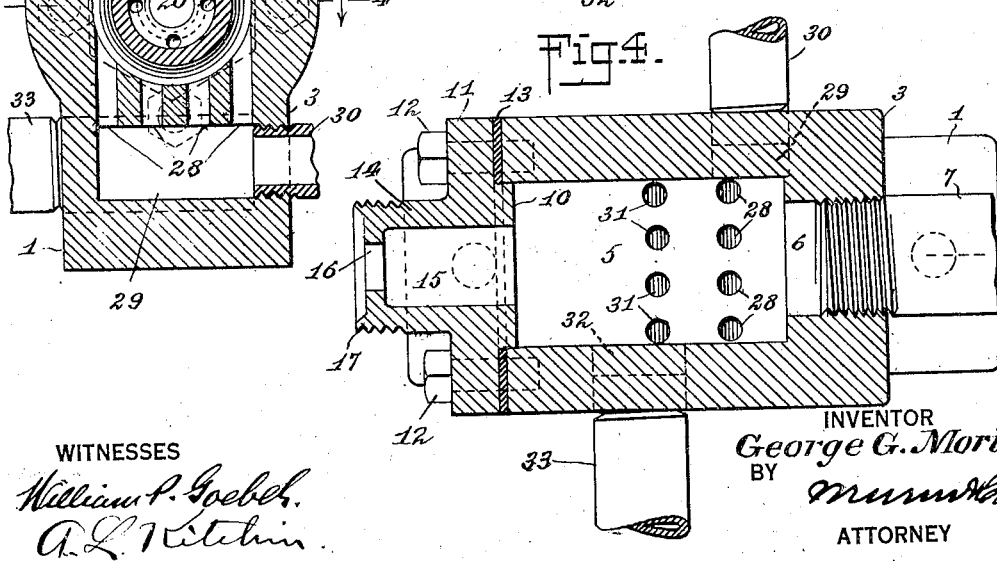
WITNESSES
INVENTOR
George G. Morin
BY
ATTORNEY Patented June 17, 1930

1,765,090

UNITED STATES PATENT OFFICE

GEORGE G. MORIN, OF HOLYOKE, MASSACHUSETTS

BALANCED THREE-WAY VALVE

Application filed January 4, 1928. Serial No. 244,463.

This invention relates to valves, and particularly to what are known as balanced valves, the object being to provide an improved form of balanced three-way valve which may be caused to automatically close or set so that it must be manually opened and closed.

Another object of the invention is to provide an improved form of three-way balanced valve, wherein the outlet ports are so formed as to present a maximum opening, while preventing any part of the piston or the piston rings from being interfered with.

A still further object of the invention is to provide in a balanced three-way valve, a self-closing spring, and also small equalizing ports in the end of the piston whereby when the spring is in use it may readily function at all times.

In the accompanying drawing—

Figure 1 is a side view with part in section illustrating a valve embodying the invention.

Figure 2 is a longitudinal vertical sectional view through Figure 1, showing the piston moved to an open position.

Figure 3 is a transverse sectional view through Figure 1, approximately on line 3—3.

Figure 4 is a horizontal sectional view of the casing, taken approximately on line 4—4 of Figure 3.

Referring to the accompanying drawing by numerals, 1 indicates a base which is provided with openings 2 whereby screws or other fastening means may be used to secure the base in a desired position. A neck 3 integral with base 1 extends from one face of the base and this neck merges into what may be termed a casing 4 formed with a valve chamber 5. Preferably members 1, 3 and 4 are one solid casting. The valve chamber 5 has a comparatively large opening 6 at one end, said opening being threaded for receiving the steam supply pipe 7. By reason of the opening 6, chamber 5 is provided with an end or abutment 8 which limits the movement of piston 9 in one direction. The opposite end of the chamber 5 to the end 8 is open as far as the casing 4 is concerned. This open end of the chamber 5 is normally closed by a projection 10 integral with the end plate 11 which is held to the casing 4 by any suitable means, as for instance, clamping bolts 12. A gasket 13 surrounds the projection 10 and acts to provide a tight packing. The end plate 11 is provided with an extension 14 which is formed with a spring chamber 15, with a bore 16 and a projecting section 17 acting in connection with the nut 18 as a packing gland, whereby the packing 19 is properly packed around the piston rod 20 which extends through an opening in the nut 18 and through the bore 16. The rod 20 at the inner end extends through the spring 21, and has a threaded end screwed into the end section 22 of piston 9. This end section is preferably cast integral with the piston 9 and is provided with a central bore for receiving the threaded section 23 and also with a plurality of small bores 24 for permitting steam or other expanding gases to pass from chamber 5 into chamber 15, and thus equalize the pressure on the respective ends of piston 9.

From Figure 2 it will be noted that the piston 9 is provided with a central bore 25, and the small bores 24 merge into this central bore so that there will always be an equal pressure on each end of the piston. The piston 9 is provided preferably with a piston ring 26 adjacent each end, whereby a tight sliding fit is secured. The piston rod 20 may be actuated by any desired means, as for instance, by cable 27, said cable acting to move the piston from the closed position shown in Figure 1 to the open position shown in Figure 2, said action being against the action of spring 21. When the cable 27 is released, spring 21 will automatically and rather quickly move piston 9 over to the position shown in Figure 1, whereupon the valve is closed. As indicated particularly in Figure 2, the inlet pipe 7 is of ample size, and in order to permit steam in ample volume to pass through the valve, a plurality of small outlet ports 28 are provided, said ports being in a row as shown in Figure 4 and all merging into the outlet passage-way 29 which is connected to a power cylinder or any other device as desired. When the valve is open as shown in Figure 2, steam passes through pipe 7 into chamber 5, and from thence through the ports 28 into passage-way 29, and from passage-way 29 out through the pipe 30 to the steam cylinder or other power member using steam. After steam has been permitted to flow as just described, piston rod 20 is released and piston 9 is moved over to the position shown in Figure 1. This will shut off any new supply of steam, and will in addition, connect the passage-way 29 and associated parts with the exhaust ports 31, which in turn are connected with an exhaust passage-way 32, and said exhaust passage-way is connected with the exhaust pipe 33 leading to any desired point. The steam may exhaust in this manner by reason of the fact that the piston 9 is provided with a cut-away portion 34 whereby an enclosed space or chamber is provided which permits the connection of the ports 28 and 31 when the valve is closed. It will be noted that both sets of ports 28 and 31 are small, but sufficiently numerous to accommodate a desired volume of steam. The reason that these ports are made small and numerous instead of formed into one large port, is to permit the piston 9 to function properly. If one large port was provided for the inlet and one for the outlet, one of the rings 26 might drop into the port somewhat, and either stop the action of the piston or retard said action. A large port would also cause an appreciable wear between the piston ring and the metal forming the port. Preferably, the spring 21 is used in order to cause a quick and automatic closing when the parts are released, but if desired, this spring could be eliminated or removed at any time and piston rod 20 manually or otherwise operated in both directions so as to manually or otherwise open and close the valve. It will also be noted that the end or shoulder 8 is so positioned that the piston 9 cannot over-travel, but must stop when the ports 28 are fully open to the cut-away portion 34. Also, the parts are so proportioned that one end of the piston will strike the portion 10 when the piston has been moved to an open position.

The valve may be used for many purposes where a short admission of fluid pressure is desired or necessary, but is particularly adapted to steam dipper trips. By removing the spring 21, the valve may be used as an ordinary three-way valve such as used on steam shovels to admit and exhaust the steam from a ram which operates the hoisting friction clutch. In forming the ports 24, they are comparatively small but numerous, so that in case one or more become clogged for any reason, the balancing effect will be maintained as long as at least one port is open.

What I claim is:

1. A balanced valve formed with a casing having a piston chamber, an inlet port extending through one end of said casing centrally of said cylinder, a plurality of outlet ports extending from the side walls of said chamber, a plurality of exhaust ports, a piston arranged in said chamber, said piston being formed with a central cut-away portion and a passageway extending entirely therethrough for admitting steam at both ends, means for shifting said piston to one end of said piston chamber for causing said inlet ports and outlet ports to be in communication, said means being capable of movement for shifting the piston to the opposite end of said chamber for causing said outlet ports and said exhaust ports to be in communication and a spring positioned in said casing acting to move said piston to a closed position.

2. A balanced three-way valve, comprising a casing formed with a piston chamber open at one end, said casing being formed with an inlet opening merging into said chamber at the end opposite the said open end, a closure plate for normally closing said open end, said closure plate being formed with a spring chamber of a less diameter than the piston chamber, a piston arranged in said piston chamber, a piston rod extending from said piston through said spring chamber, a spring arranged in said spring chamber acting on said piston for moving the same in one direction, said rod acting to move the piston in the opposite direction, said casing being provided with two series of ports, one acting as outlet ports for directing steam to a cylinder, and the other for directing steam to an exhaust passage-way, and a pipe in free communication with each series of ports.

3. In a balanced three-way valve, a casing provided with a series of inlet ports, a series of outlet ports, an inlet passage-way and a piston chamber in free communication with all of said ports and said passage-way, a piston arranged in said chamber formed with a reduced central portion, a large bore extending partly therethrough and a plurality of small bores extending the remaining distance through the piston, an end plate connected to said casing, said end plate being formed with a projection extending into said piston cylinder so as to form an end thereto, said end plate having a chamber, a spring arranged in said chamber acting on one of the walls of the chamber and on said piston for moving the piston in one direction, and a piston rod connected with said piston and extending beyond said end plate whereby the piston rod may be actuated manually.

4. In a balanced three-way valve, a tubular piston formed with an annular recess between the ends, a large bore extending from one end part of the length of the piston, a small threaded bore extending the remaining length, a plurality of small bores extending from said large bore to the opposite end of the piston, a groove arranged exteriorly and near each end of the piston, and a piston ring arranged in each of the grooves.

5. In a balanced three-way valve, a casing provided with a piston chamber and a plurality of ports acting as inlet, outlet and exhaust ports, a sliding piston arranged in said chamber, an end plate formed with a recess and a piston rod extending from said piston through said end plate and a spring surrounding part of said piston, said spring being normally arranged in said recess and acting on part of the end plate and on the piston for moving the piston in one direction, said rod being usable for moving the piston in the opposite direction.

6. In a self-closing balanced three-way valve, a casing provided with a piston chamber, an inlet opening, a row of outlet ports and a row of exhaust ports, a piston slidingly positioned in said chamber and provided with an exteriorly positioned recess formed of a length to permit communication between said exhaust ports and said outlet ports when the piston is in a closed position, the end of said chamber having said inlet opening being so positioned as to limit the movement of the piston in one direction whereby the piston will not over-travel in that direction, an end plate removably secured to said casing formed with a projection extending into said piston chamber, said projection extending in sufficiently far to present an abutment for preventing the piston from over-traveling in the opposite direction, manually actuated means for moving said piston to an open position, and a spring positioned in said end plate continually acting on said piston for moving the same to a closed position.

7. A balanced three-way valve comprising a casing formed with a piston chamber open at one end, said casing being formed with an inlet merging into said chamber at the end opposite the said open end, a closure plate for normally closing said open end, a piston arranged in said piston chamber said piston being formed with a passageway extending entirely therethrough, a piston rod extending from said piston through said closure plate, spring means acting on said piston on said closure plate for moving the piston in one direction, said rod acting to move the piston in the opposite direction, said casing being provided with two series of ports, one acting as outlet ports for directing steam to a cylinder and the other for directing steam to an exhaust passageway, and a pipe in free communication with each series of ports.

Signed at Holyoke in the county of Hampden and State of Massachusetts this 31st day of December, A. D. 1927.

GEORGE G. MORIN.